United States Patent [19]

Reynard

[11] Patent Number: 4,588,652

[45] Date of Patent: May 13, 1986

[54] WELDED CONSTRUCTION AND COMPONENTS THEREFOR

[75] Inventor: Kenneth Reynard, Thirsk, England

[73] Assignee: George Blair PLC, Newcastle Upon Tyne, England

[21] Appl. No.: 628,324

[22] Filed: Jul. 6, 1984

[30] Foreign Application Priority Data

Jul. 8, 1983 [GB] United Kingdom ................. 8318589

[51] Int. Cl.$^4$ ............................................. B32B 15/00
[52] U.S. Cl. .................................... 428/594; 428/596; 403/271; 228/175; 228/214
[58] Field of Search ........................ 428/594, 596, 641; 228/175, 186, 187, 214; 403/270, 271, 272

[56] References Cited

U.S. PATENT DOCUMENTS 2,510,727 6/1950 Sussenbach ......................... 228/214
3,337,711 8/1967 Garscia ................................ 228/175
4,187,407 2/1980 Marko, Jr. ........................... 403/271

OTHER PUBLICATIONS

Lindberg, "Processes and Materials of Manufacture"-'-2nd edition, 1977, Allen and Bacon Inc., Boston, pp. 425-426.

Primary Examiner—L. Dewayne Rutledge
Assistant Examiner—Robert L. McDowell
Attorney, Agent, or Firm—Abelman Frayne Rezac & Schwab

[57] ABSTRACT

A member is secured to a supporting surface by a peripheral seam weld that partially closes off an area between the member and the surface. In the region of the or each interruption in the continuity of the seam weld, there is provided between the member and the supporting surface an insert of a material that is stable in shape at normal temperatures but that has expanded and flowed at elevated temperature, e.g. due to heating by the welding process, to complete the sealing of said area between the member and the surface, in cooperation with the seam weld.

11 Claims, 5 Drawing Figures

WELDED CONSTRUCTION AND COMPONENTS THEREFOR

BACKGROUND OF THE INVENTION

This invention relates to welded constructions and components of such structures. It is particularly concerned with shipping containers such as are in common use for the carriage of cargo, and the hinges of such containers.

Standard cargo containers are expected to undergo severe operational conditions, being exposed to the weather, often in a salt-laden atmosphere. This makes it important to protect such containers as far as possible from corrosion. One area which is difficult to protect lies under the hinges of the container doors. These hinges are made of separate members, usually of cast or forged steel, welded to the main body and doors of the container, and it can be difficult if not impossible to make a weld that extends without a break around the periphery of the hinge member to prevent rust developing between the member and the surface to which it is welded. Such problems can arise in other welded structures which are similarly difficult to protect against corrosion.

SUMMARY OF THE INVENTION

According to one aspect of the present invention, there is provided a method of welding a member to a supporting surface in which a seam weld is made around a part of the periphery of the area of an interface between the member and the surface, with at least one portion of said periphery remaining unwelded or having a non-continuous weld, in said portion a material being disposed before welding that is softened or melted to a flowable state when it is heated by the welding process, thereby to form a seal between the member and said surface over the length of said peripheral portion.

According to another aspect of the invention, there is provided a welded structure comprising a member secured to a supporting surface, said member being welded to the surface by a seam weld that does not extend completely around the periphery of the area of an interface between the member and said surface, in the region of discontinuity of said seam weld there being an insert material that is stable in shape at normal temperatures but that has flowed at elevated temperature to form a seal between the member and the surface over said region of discontinuity.

The rise in temperature due to the welding process will vary to some extent depending upon the form of the member. In the case of the container hinge member mentioned above, the maximum temperature may be somewhat greater than 400° C., and a material that becomes flowable at about 300° C. would be suitable. A material that flows at a lower temperature, e.g. down to about 200° C., could be used as there would still be no risk of it flowing again at the temperature of normal operating conditions, e.g. ambient temperature provided the material is not one that is adversely affected by the maximum temperatures reached in welding. Preferably the material is one which also expands when heated and remains in an expanded state when cooled.

The invention is illustrated by way of example in the accompanying drawings.

DESCRIPTION OF THE PREFERRED EMBODIMENTS

Figure 1:
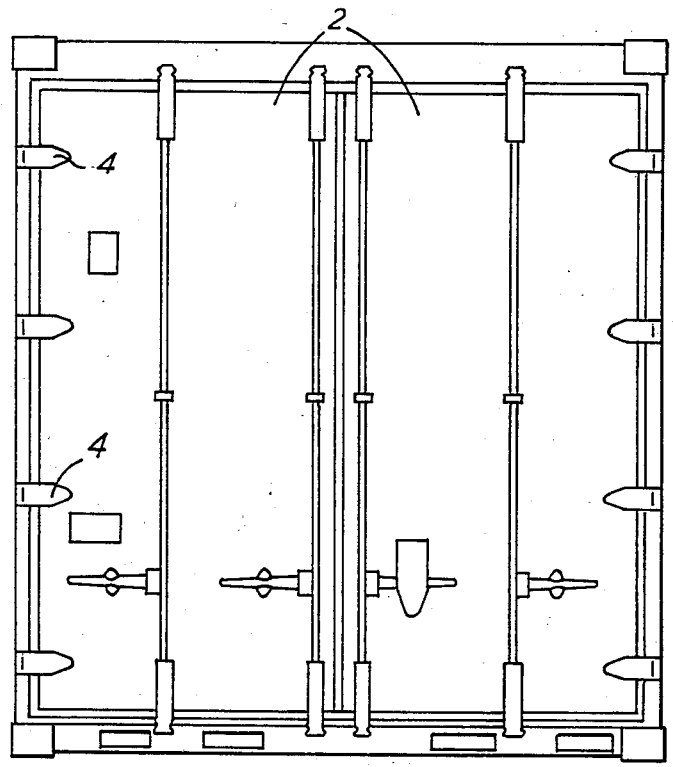
FIG. 1 is a rear view of a standard shipping container according to the invention, the doors of which incorporate welded hinge parts in accordance with the invention.
Figure 2:
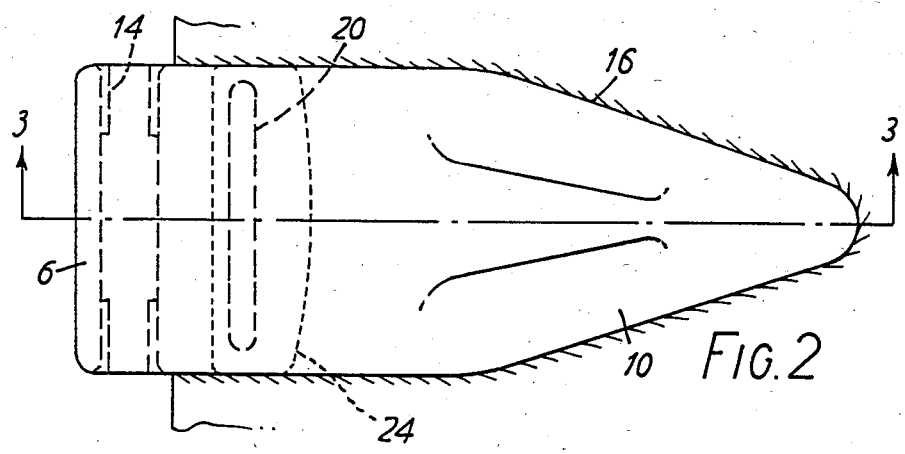
FIGS. 2 and 3 are a plan view and an axial section respectively a part of a rear door hinge for the container of FIG. 1, and FIGS. 4 and 5 are a plan view of an axial section of a hinge in a container side door mounting constructed in accordance with the invention.
Figure 3:
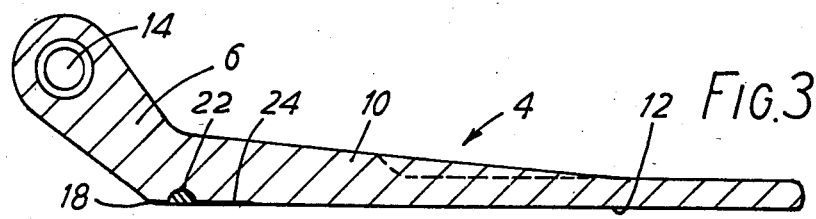

FIG. 1 illustrates the rear of a standard shipping container in which two rear doors 2 are hinged to the container body at their outer edges, hinge parts 4 fixed to the doors comprising wings 6, extending laterally from the door edges to be pivotally retained in fixed parts (not shown) of the hinges secured to the rear end frame 8 of the container body. The details shown in FIG. 1 are of conventional form, and other than the door hinge parts 4, which will now be described in more detail with reference to FIGS. 2 and 3.

The hinge part 4 is a cast steel member having a body 10 with a flat underface 12 that lies against the outer surface of the container door 2. The wing 6 projects at an obtuse angle from the base and has a bore 14 for the hinge pin. The angle between the base and the wing is determined by the function of the hinge.

In securing the hinge part 4 in place, seam welding 16 along the main side edges and nose of the base presents no problem. It is extremely difficult, however, to make a weld seam along the end edge 18 of the base because it is obscured by the wing 6, and it is found that this region is often a starting point for corrosion that then spreads unseen between the adjoining faces of the hinge part and the underlying surface of the door.

In the illustrated hinge part, an elongate recess 20 is formed in the underface of the base immediately adjacent the edge in question and extending nearly to the opposite main side edges of the part. This recess has a sealant 22 inserted in it, consisting of Kelseal (RTM) No. 15071 manufactured by Evode Limited, of Stafford, England.

When the hinge part is welded in place there is local heating. The insert softens and expands to double its volume at temperatures above 160° C., and flows to form a permanent and flexible synthetic rubber seal over the portion of the periphery of the hinge part between the ends of the seam weld, as indicated at 24. The expansion of the material during heating ensures it spreads when in the flowable state and cooperates with the seam weld to seal off completely the area covered by the base. As the welded structure cools down the material sets, adhering firmly to both the adjoining surfaces of the interface and thereby preventing the ingress of moisture that could eventually give rise to corrosion.

It will be understood that the recess for the sealing material can be formed in either or both of the surfaces facing onto the area to be sealed and that in particular instances it may be possible to insert a quantity of sealing material before welding without providing a containing recess.

Figure 4:
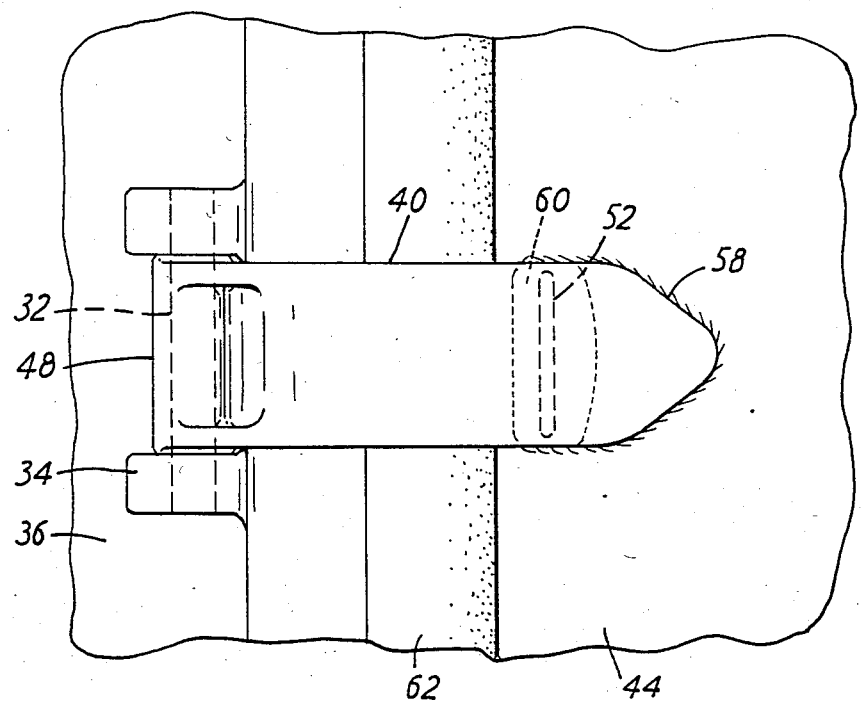
Figure 5:
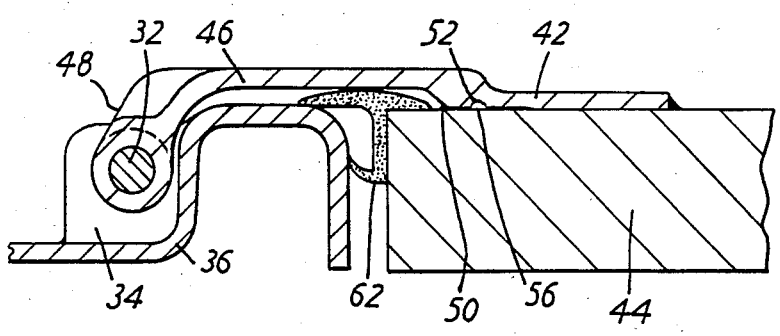

FIGS. 4 and 5 illustrate a container side door hinge in which a pivot pin 32 is held in lugs 34 welded to the container body at a door post 36 and a hinge part 40 has a body 42 similarly to the previous example lying against the outer face of the door 44, and a wing 46 extending from the body over the door post to terminate in a collar 48 which fits between the lugs 34 and through which the pivot pin 32 passes. Because of the need to minimise external projections at the side of the container it will be noted that outer edge 50 of the body 42 is even less accessible than the hinge part outer edge of the first example, so that a seam weld 58 between the hinge part and the door can only provide a seal around the exposed side edges and inner nose of the hinge part. As in that first example an elongate recess 52 is formed in the underface of the hinge part body immediately adjacent the edge 50, to receive a sealant 56. The heat of welding the seam weld 58 similarly causes the insert to soften and flow, and the area 60 in FIG. 4 indicates the typical zone over which the sealant will spread and set. Also illustrated is an elastomeric weather seal 62 secured to the door when it is mounted on the container.

The particular sealant referred to in the illustrated examples is a plastisol in the form of a silicone-based material incorporating polyvinylchloride. Different plastisols and other materials can be employed, provided they seal adequately with the surfaces and become flowable in the required temperature range, and preferably are left in an expanded state to ensure the extent of the seal. Possible other materials that can be employed for the seal are silicones, natural waxes having a high enough melting point (e.g. above 160° C.), and intumescent materials similar to those employed for automatically sealing doors in reponse to the heat in the event of an outbreak of fire.

Although the welding of door hinges is shown in both illustrated examples, it will be appreciated that the invention can be applied to other welded constructions.

I claim:

1. A welded structure comprising a supporting surface, a member secured to said surface, an interface between said member and said surface, a seam weld joining the member and the surface extending partially around said interface along a periphery thereof, there being at least one interruption in the seam weld along the extend of said periphery, a recess being provided in at least one of the member and the supporting surface in the region of said interruption for receiving an insert before the member is secured to said surface while permitting direct contact between the member and the surface, said insert being of a material that is stable at normal temperatures but that has flowed at an elevated temperature, whereby a seal is provided by said material between the member and the surface along said at least one interruption of the peripheral seam weld.

2. A welded structure according to claim 1 in the form of a transport container having at least one hinged door to which are welded hinge parts in the form of said members provided with sealing inserts.

3. A welded structure comprising a supporting surface and a hinge part secured to said surface, the hinge part comprising a body portion applied against said surface, and a wing extending from a junction with said body part to project away from the supporting surface, an interface between said body portion and said surface, a seam weld joining the body portion and the surface extending partially around said interface along a periphery thereof, there being at least one interruption in the seam weld along said periphery, an insert at said interface of a material that is stable at normal temperatures but that flows at elevated temperature, whereby to provide a seal between the body portion and the surface along said at least one interruption of the peripheral seam weld.

4. A welded structure according to claim 3 wherein a recess is provided, within the area of the interface, for initial reception of the insert of material in at least one of the member and the supporting suface.

5. A welded structure according to claim 3 wherein the insert material is set in an expanded state after flowing to form the seal.

6. A welded structure according to claim 3 wherein said insert is a silicone-based material.

7. A hinge part comprising a body for attachment to a supporting surface by seam welding around an incomplete length of the body periphery, a wing extending generally obliquely from one edge of said body and pivot means on said wing spaced from the body for connection to a further hinge part in a pivotable manner, a recess in an undersurface of said body to receive an insert of sealing material that is stable at normal temperatures but that is flowable at elevated temperature, whereby the heat of said seam welding causes flow of said material to complete the sealing of said periphery in cooperation with the seam weld.

8. A transport container in the form of a welded structure comprising at least one hinged door, a supporting surface provided by said at least one door, hinge members secured to said surface, an interface between each member and said surface being formed thereby, a seam weld joining each member to said surface, said seam weld extending partially around a periphery of said interface, there being at least one interruption in the seam weld along said periphery, an insert at said interface of a material that is stable at normal temperatures but that flows at elevated temperature, whereby to provide a seal between the member and the surface along said at least one interruption of the peripheral seam weld.

9. A method of welding a member to a supporting surface with an interface between a face of the member and the surface, comprising placing the member against the supporting surface to provide said interface while disposing a sealing material at said interface in the region of a portion of the periphery of the area of said interface, forming an essentially continuous seam weld around the remainder of said periphery while leaving said portion of the periphery unwelded or providing it with a non-continuous weld, the sealing material being heated by the welding process independently of the electrical properties of said material, so that it is softened or melted to a flowable state thereby to form a seal between the member and said surface over the length of said portion of the periphery to complete the sealing of said interface from the exterior.

10. A method according to claim 9 including forming a recess in at least one of said supporting surface and member, depositing said sealing material in said recess, and disposing said recess and said material in the area of said interface when said member is placed against said surface.

11. A method according to claim 9 wherein a material expands on heating to form the seal in an expanded state.

* * * * *